C. C. CRAVEN.
AGRICULTURAL MACHINE.
APPLICATION FILED JAN. 19, 1918.

1,302,636.

Patented May 6, 1919.
3 SHEETS—SHEET 1.

Inventor
CLAUD C. CRAVEN

By Watson E. Coleman
Attorney

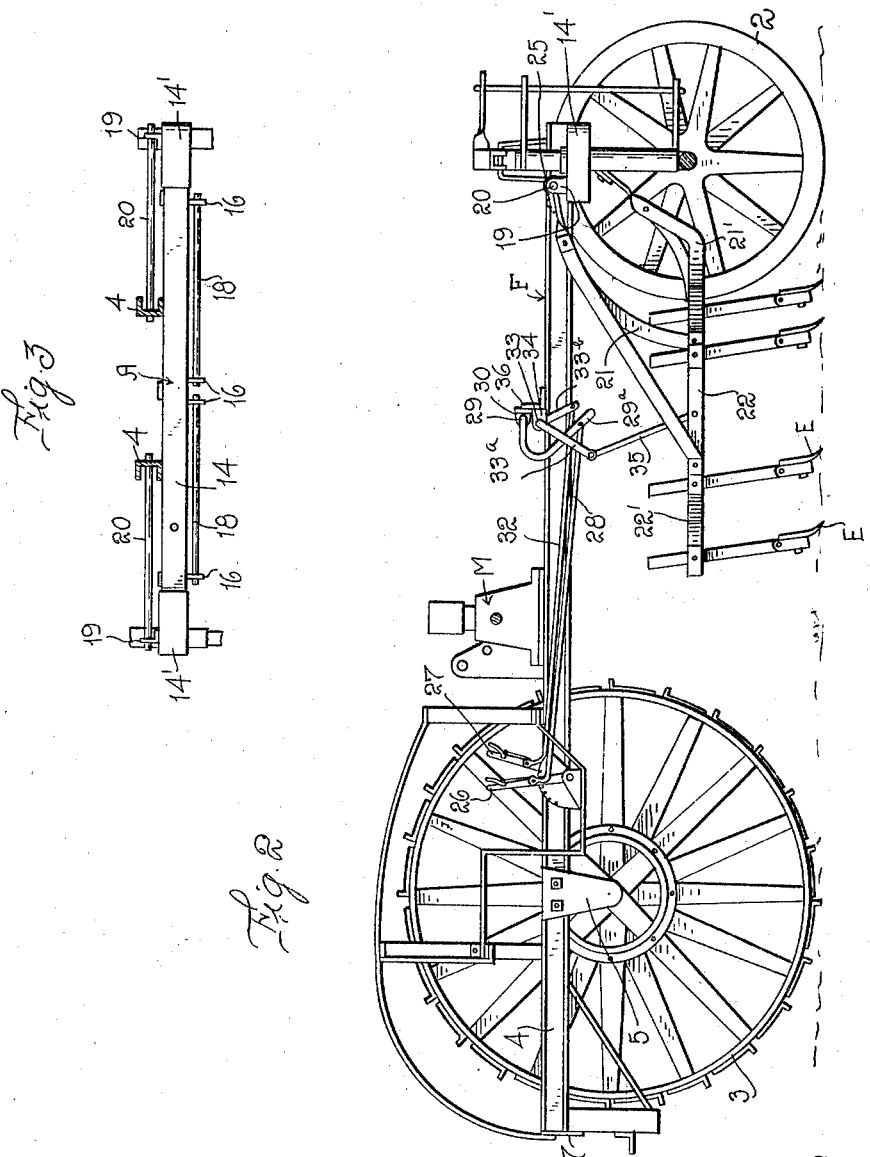

C. C. CRAVEN.
AGRICULTURAL MACHINE.
APPLICATION FILED JAN. 19, 1918.
1,302,636.
Patented May 6, 1919.
3 SHEETS—SHEET 3.
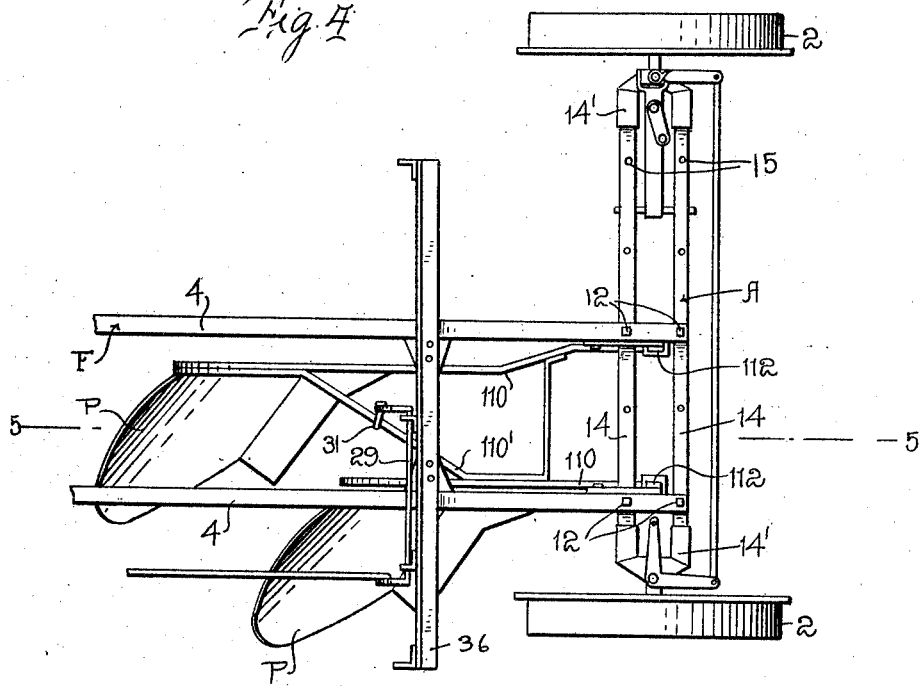
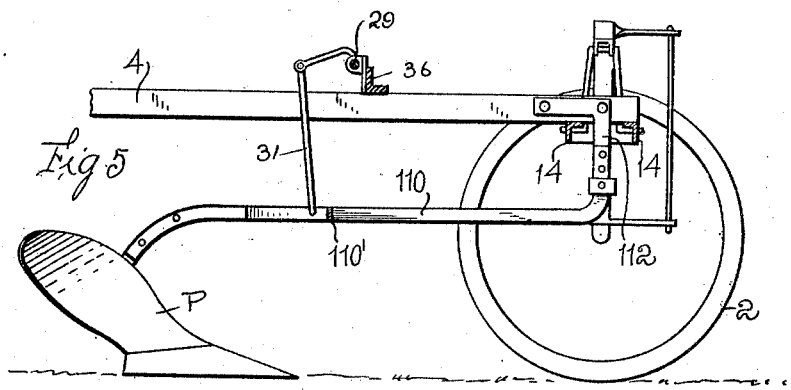
Inventor
CLAUD C. CRAVEN

UNITED STATES PATENT OFFICE.

CLAUD C. CRAVEN, OF KANSAS CITY, MISSOURI.

AGRICULTURAL MACHINE.

1,302,636.   Specification of Letters Patent.   Patented May 6, 1919.

Original application filed September 8, 1915, Serial No. 49,487. (Patent No. 1,224,716, dated May 1, 1917.) Divided and this application filed January 19, 1918. Serial No. 212,658.

*To all whom it may concern:*

Be it known that I, CLAUD C. CRAVEN, a citizen of the United States, residing at Kansas City, in the county of Jackson and State of Missouri, have invented certain new and useful Improvements in Agricultural Machines, (the same being a division of my prior Patent No. 1,224,716, dated May 1, 1917,) of which the following is a specification, reference being had to the accompanying drawings.

This invention relates to certain improvements in agricultural machines and has relation more particularly to a device of this general character especially designed and adapted for use in the working of soil, and it is an object of the invention to provide a device of this general character which is adapted to work the soil at a plurality of points transversely of the direction of travel of the machine and wherein certain of the ground engaging elements may be raised or lowered independently of the remainder of said elements.

It is also an object of the invention to provide a machine of this general character having novel and improved means whereby it may be employed with equal facility as a cultivator or plow.

An additional object of the invention is to provide a novel and improved machine of this general character which may be employed as a cultivator in connection with a plurality of rows and which may be employed to turn a plurality of furrows.

The invention consists in the details of construction and in the combination and arrangement of the several parts of my improved agricultural machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Fig. 2 is a view in side elevation of my improved machine as herein disclosed;

Fig. 3 is a fragmentary transverse sectional view taken through the forward portion of my improved machine with certain of the parts omitted;

Fig. 4 is a view in top plan illustrating an agricultural machine arranged in accordance with a further embodiment of my invention; and Fig. 5 is a sectional view taken substantially on the line 5—5 of Fig. 4.

Figure 1:
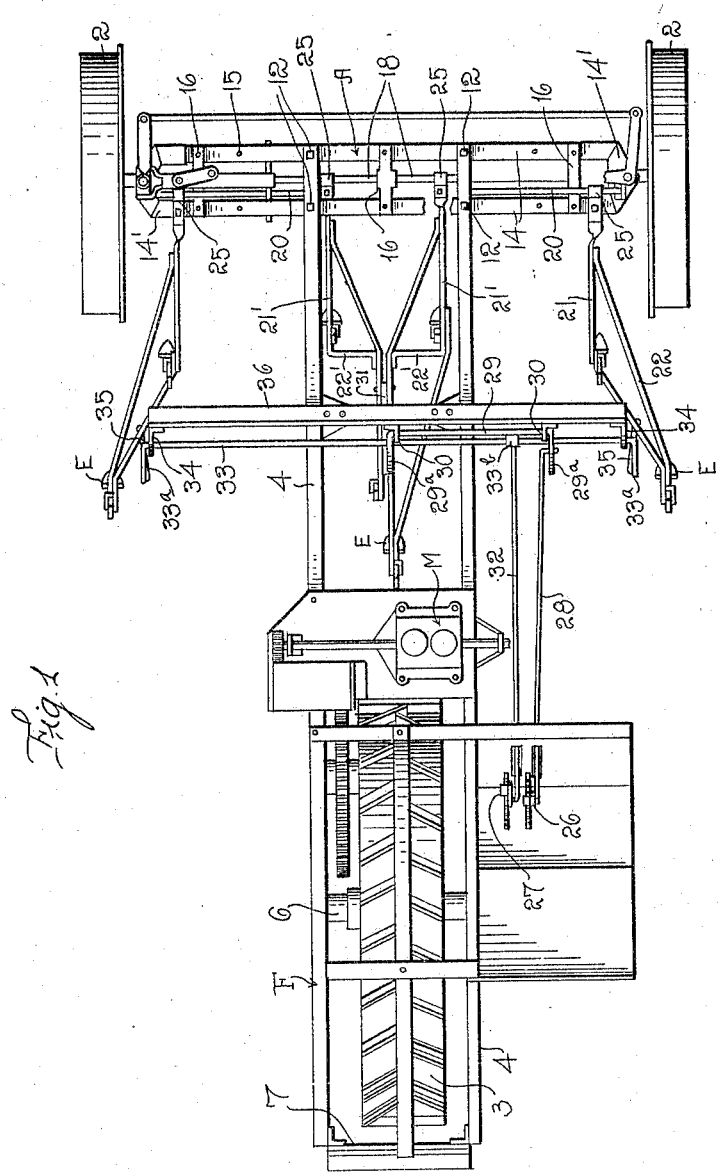
Figure 1 is a view in top plan of an agricultural machine constructed in accordance with an embodiment of my invention.

As disclosed in the accompanying drawings F denotes a frame embodying parallel beams 4 having their rear end portions connected by the cross beams 7. Depending from the beams 4 at predetermined points inwardly of the rear end portions are the bearings 5 mounted upon the shaft 6 and between the beams 4 is the traction wheel 3 adapted to be driven by the motor M.

The forward end portions of the beams 4 are rested upon the transversely disposed auxiliary frame A. This frame A embodies the parallel beams 14 suitably connected at their terminals by the castings 14'. The beams 14 are provided with a series of longitudinally spaced openings 15 through which the bolts 12 or other fastening elements are disposed in order to secure the beams 4 to the auxiliary frame A. The bolts 12 or the like are removable so that in accordance with the requirements of practice the mounting of the beams 4 upon the frame A may be adjusted longitudinally of said frame or in a direction transverse of the frame F.

Coacting with the opposite end portions of the auxiliary frame A are the steering wheels 2, the construction and operation of which being particularly described and claimed in my Patent No. 1,224,716 dated May 1, 1917, and of which the present application is a division.

Depending from the frame A at each side of the center thereof is a pair of longitudinally alined bearings or supports 16 with which are engaged the extremities of a rod 18. The structure results in a rod 18 being positioned at opposite ends of the frame A and in longitudinal alinement.

Extending upwardly from the opposite end portions of the frame A are the bearings or supports 19 and engaged with said bearings or supports 19 and the forward end portions of the beams 4 are the rods 20.

Pivotally engaged as at 25 with each of the rods 18 and 20 are the beams 21 and 21' of the frames 22 and 22' and which frames are provided with the ground engaging elements E of a cultivator type. The beams 21 engaging the rods 20 are arched in order to prevent said beams from offering any obstruction to the steering wheels 2.

Disposed transversely of the frame F is the shaft 29 provided with the rock arms 29ª with one of which is engaged the rod 31. The rod 31 is directly connected with the frames 22'. Operatively engaged with the second rock arm 29ª is the rod 28 which is also engaged with the lever 26. It will be self-evident that upon swinging the lever 26 in one direction, the frames 22' will be elevated and vice versa in accordance with the requirements of practice.

Also rotatably supported by the frame F is a second transversely disposed rock shaft 33 provided with rock arms 33ª with which are engaged the rods 35 directly engaged with the outer or side frames 22. The shaft 33 is also provided with the crank arm 33ᵇ with which is engaged the rod 32 also operatively engaged with the second lever 27. It will be self-evident that upon proper manipulation of the lever 27 the outer or side frames 22 may be raised or lowered in accordance with the requirements of practice.

As herein disclosed the bearings 30 and 34 for the shafts 29 and 33 respectively are carried by a beam or bar 36 disposed transversely of the frame F and suitably secured to the side beams 4 thereof.

As disclosed in Figs. 1, 2 and 3 my improved machine is assembled for cultivation in connection with a plurality of rows and it is to be particularly noted that when the occasion of practice requires the intermediate frames 22' may be elevated independently of the outer frames 22 or vice versa, or if desired both sets of frames 22 and 22' may be elevated by imparting the proper pull upon the levers 26 and 27.

In the form of invention illustrated in Figs. 4 and 5 I show my improved machine employed in connection with ground engaging elements of a plow type. When in use the beams 4 are adjusted longitudinally of the auxiliary frame A to position the same substantially to one side of the longitudinal center. The depending plates or supporting arms 112 are secured to the forward end portions of the beams 4 and pivotally engaged with said plates or arms 112 are the beams 110 of the plows P and which beams are connected as indicated at 110' so that the plows P are assembled in gang. The depending rod 31 of the shaft 29 in this instance is engaged with the connecting member 110' so that the plows P may be raised or lowered as may be desired by the requirements of practice. In adjusting the arms 4 of the frame F to one end of the frame A one of the plows P will be positioned in a furrow previously plowed and preferably positioned the width of one furrow to the left of the steering wheel, and a second plow P will be so positioned as to produce a furrow in which the traction wheel 3 will ride. The second steering wheel 2 will ride upon the land not yet broken.

From the foregoing description, it is thought to be obvious that an agricultural machine constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the character described comprising a main frame, a transversely disposed auxiliary frame coacting with the forward end portion of the main frame, a transversely disposed beam carried by the main frame rearwardly of the auxiliary frame, ground working elements connected with the auxiliary frame adjacent the opposite ends thereof and mounted for vertical swinging movement, another ground working element connected to the auxiliary frame between the first named ground working elements and also mounted for vertical swinging movement, a rock shaft supported by the beam, connections between the first named ground working elements and the rock shaft whereby said first named elements are raised and lowered in unison, means for rocking the shaft, a second rock shaft carried by the beam, a connection between said second shaft and the last named ground working element, and means for rocking the second named shaft.

2. A machine of the character described comprising a main frame, a transversely disposed auxiliary frame coacting with the forward end portion of the main frame and extending beyond opposite sides thereof, rods supported by the auxiliary frame at the opposite sides of the main frame and disposed longitudinally of the auxiliary frame, another rod supported by the auxiliary frame and extending longitudinally thereof, the first named rods being positioned adjacent one face of the auxiliary frame and the last named rod adjacent the opposed face of the frame, ground working elements pivotally engaged with the first named rods, a ground working element pivotally engaged with the last named rod, means coacting with the first named elements for imparting swinging movement thereto, and means coacting with the last named element for imparting swinging movement thereto.

3. A machine of the character described comprising a main frame, a transversely disposed auxiliary frame coacting with the forward end portion of the main frame, said auxiliary frame being longitudinally adjustable relative to the main frame, a transverse beam carried by the main frame rearwardly of the auxiliary frame and extending beyond opposite sides of the main frame, a ground working element carried by the auxiliary frame and mounted for swinging movement in a vertical plane, and means carried by the beam and operatively connected with the ground working element whereby said element may be raised or lowered.

In testimony whereof I hereunto affix my signature in the presence of two witnesses.

CLAUD C. CRAVEN.

Witnesses:
L. Z. PRITCHARD,
W. A. RICHTER.

Copies of this patent may be obtained for five cents each, by addressing the "Commissioner of Patents, Washington, D. C."